United States Patent
Council

(10) Patent No.: US 6,192,114 B1
(45) Date of Patent: Feb. 20, 2001

(54) METHOD AND APPARATUS FOR BILLING A FEE TO A PARTY INITIATING AN ELECTRONIC MAIL COMMUNICATION WHEN THE PARTY IS NOT ON AN AUTHORIZATION LIST ASSOCIATED WITH THE PARTY TO WHOM THE COMMUNICATION IS DIRECTED

(75) Inventor: Michael O. Council, Cordele, GA (US)

(73) Assignee: CBT Flint Partners, Cordele, GA (US)

( * ) Notice: Under 35 U.S.C. 154(b), the term of this patent shall be extended for 0 days.

(21) Appl. No.: 09/145,710

(22) Filed: Sep. 2, 1998

(51) Int. Cl.$^7$ .......................... H04M 15/00; H04M 11/00
(52) U.S. Cl. ................. 379/114; 379/100.08; 379/93.24; 709/206
(58) Field of Search ................................ 379/88.19, 88.2, 379/88.211, 93.24, 100.08, 142, 88.13, 127, 88.14, 88.12, 88.22, 88.23, 100.04, 100.09, 100.03, 93.02, 93.03, 900, 908; 709/206, 203, 207, 219, 238, 245

(56) References Cited

U.S. PATENT DOCUMENTS

| | | | |
|---|---|---|---|
| 5,327,486 | * 7/1994 | Wolff et al. ........................... | 379/142 |
| 5,473,671 | * 12/1995 | Patridge, III ......................... | 379/142 |
| 5,625,680 | * 4/1997 | Foladare et al. ...................... | 379/199 |
| 5,742,668 | * 4/1998 | Pepe et al. ........................... | 379/67.1 |
| 5,835,087 | * 11/1998 | Herz et al. ........................... | 345/327 |
| 5,987,606 | * 11/1999 | Cirasole et al. ...................... | 713/200 |
| 6,005,870 | * 12/1999 | Leung et al. ......................... | 379/201 |
| 6,023,723 | * 2/2000 | McCormick et al. ................ | 709/206 |
| 6,061,718 | * 5/2000 | Nelson ................................. | 709/206 |
| 6,064,723 | * 5/2000 | Cohn et al. .......................... | 379/88.14 |

* cited by examiner

Primary Examiner—Wing F. Chan
Assistant Examiner—Rexford Barnie
(74) Attorney, Agent, or Firm—Thomas, Kayden, Horstemeyer & Risley, L.L.P.

(57) ABSTRACT

A method and apparatus for determining whether a party sending an email communication is on a list of parties authorized by the intended receiving party. If the sending party is not on the list of authorized parties, a fee is charged to the sending party in return for the message being provided to the intended receiving party, or if the sending party has not authorized such fees to be charged, the message is simply discarded. Preferably, the present invention is implemented with Internet communications. However, the present invention can be used in private networks as well, such as local area networks (LANs) and wide area networks (WANs). Preferably, the present invention is implemented at the intended receiving party's ISP. In accordance with the well known Transmission Control Protocol/internet Protocol (TCP/IP), the destination address of the intended receiving party and the source address the sending party are contained in the IP message, commonly referred to as a datagram. When a datagram is received at the ISP, the ISP server analyzes the destination address and the source address to determine whether the source address is on a list of authorized source addresses associated with the destination address.

14 Claims, 2 Drawing Sheets

METHOD AND APPARATUS FOR BILLING A FEE TO A PARTY INITIATING AN ELECTRONIC MAIL COMMUNICATION WHEN THE PARTY IS NOT ON AN AUTHORIZATION LIST ASSOCIATED WITH THE PARTY TO WHOM THE COMMUNICATION IS DIRECTED

CROSS-REFERENCE TO RELATED APPLICATIONS

These applications are related to co-pending U.S. utility patent applications entitled "A Method and Apparatus for charging a Fee to a Party Initiating a Telephone Call When the Party is Not on an Authorization List Associated with the Called Party" filed on Aug. 27, 1998 and accorded Ser. No. 09/141,433; "A Method and Apparatus Generating and/or Updating an Authorized List Associated with a Telephone Subscriber" filed on Nov. 25, 1998 and accorded Ser. No. 09/145,710; and A Method and Application for Determining Whether a Party Placing a Call is to be Charged a Fee in Return for being Connected to the Called Party" filed on Feb. 10, 1999 and accorded Ser. No. 09/247,371, which are entirely incorporated herein by reference.

TECHNICAL FIELD OF THE INVENTION

The present invention relates to the field of communications and, more particularly, to a method and apparatus for determining whether an electronic mail communication sent to an intended recipient has been sent by a sending party that is authorized to communicate with the intended recipient, and if not, to charge the sending party a fee in order for the communication to provided to the intended recipient.

BACKGROUND OF THE INVENTION

Currently, when a subscriber of an Internet Service Provider (ISP) wants to check his or her electronic mail, the subscriber connects to the subscriber's ISP and any new mail is downloaded to the subscriber's computer, or data terminal equipment (DTE), via the subscriber's data communication equipment (DCE), e.g., a modem, which is coupled to the DTE. The subscriber may have to dial in to the ISP in order for these events to occur or the subscriber may be connected to a server that periodically connects with the ISP or that has a "nailed up" connection to the ISP to enable email for the subscriber to be downloaded to the server. In each of these cases, email intended for the subscriber is ultimately downloaded from the ISP and displayed on a monitor comprised by the subscriber's DTE.

Oftentimes, people solicit business over the Internet by sending out email messages, which may be, for example, advertisements, to large numbers of people. The recipients of these messages often are not interested in receiving these messages. Sometimes these messages contain a large quantity of data and may take quite a bit of time to download. Furthermore, some of these messages contain data such as computer viruses that can adversely affect the subscriber's computer.

Accordingly, a need exists for a method and apparatus that allow unwelcome or unsolicited email messages to be screened out so that they are not downloaded to the subscriber, or to allow the messages to be provided to the subscriber in return for charging a fee to the sender.

SUMMARY OF THE INVENTION

The present invention provides a method and apparatus for determining whether a party sending an email communication is on a list of parties authorized by the intended receiving party. If the sending party is not on the list of authorized parties, a fee is charged to the sending party in return for the message being provided to the intended receiving party. Alternatively, if the sending party has not authorized such fees to be charged, the message is simply discarded.

Preferably, the present invention is implemented with Internet communications. However, the present invention can be used in private networks as well, such as local area networks (LANs) and wide area networks (WANs). When used with LANs and WANs, the present invention could be implemented to allow users or system administrators to decide which parties' or entities' email communications will be received by the intended recipient. In this case, a fee may or may not be charged to the sending party.

All or a portion of any fee charged may be paid to the intended receiving party. A portion of the fee may be applied, for example, to the intended receiving party's ISP service account to reduce the intended receiving party's ISP service bill. The present invention is not limited with respect to the manner in which the fee is collected and/or used after the sending party has been charged.

The present invention is also not limited with respect to the location at which the method and/or apparatus are located in the communications network. Preferably, the present invention is implemented at the intended receiving party's ISP. In accordance with the well known Transmission Control Protocol/Internet Protocol (TCP/IP), the destination address of the intended receiving party and the source address the sending party are contained in the IP message, commonly referred to as a datagram.

In accordance with the present invention, when a datagram is received at the ISP, the ISP server analyzes the destination address and the source address to determine whether the source address is on a list of authorized source addresses associated with the destination address. If so, the message is saved in a location in the ISP database associated with the destination address so that it is available to be downloaded by the intended recipient. If not, the sending party corresponding to the source address is charged a fee in return for saving the message in the database for the intended recipient or the message is simply discarded.

Preferably, the service provided by the present invention is optional and can be enabled or disabled at the receiving party's ISP depending on whether the receiving party has subscribed to the service.

The present invention is capable of being implemented with any communications protocol that transmits an indication of the source of the message to the intended recipient, including communications protocols that do and do not comply with the Open Systems Interconnect (OSI) model. Preferably, the communications protocol that is used with the present invention is TCP/IP. Other types of public and private communications protocols can also be used with the present invention, including proprietary protocols, as will be understood by those skilled in the art.

These and other features and advantages of the present invention will become apparent from the following description, drawings and claims.

DETAILED DESCRIPTION OF THE INVENTION

Figure 1:
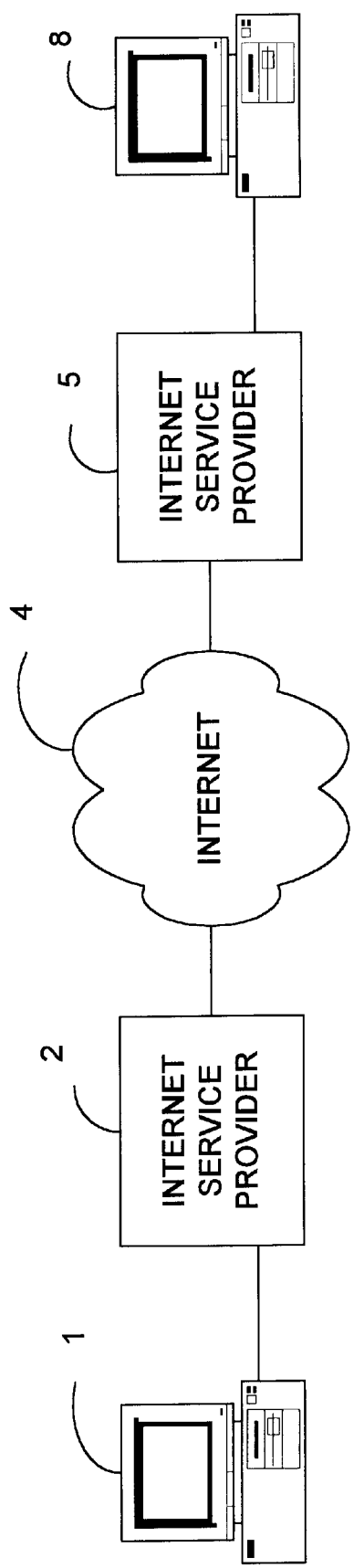
FIG. 1 is a block diagram of an Internet network with which the present invention can be implemented.

FIG. 1 is a block diagram of the preferred embodiment of the present invention wherein the present invention is implemented as part of an ISP system. End users having data terminal equipment (DTEs) 1 and 8, such as personal computers, are connected to the network 4, which preferably is the Internet, via ISPs 2 and 5, repsectively. The DTEs 1 and 8 are connected to the ISPs 2 and 5 via data communication equipment (not shown), such as modems or terminal adapters. The ISPs 2 and 5 typically comprise one or more servers and several modems, or data communications equipment devices, for interfacing with the network 4.

In accordance with the present invention, when a sending party represented by DTE 1 sends an email message to an intended receiving party represented by DTE 8, the intended receiving party's ISP 5 determines whether the source address associated with the email communication is a source address authorized by the intended receiving party. In order to perform this task, a computer (not shown) located at the ISP compares the source address with a list of source addresses associated with the destination address to determine whether the source address is an authorized source address. If so, the computer stores the message at the location in the ISP database corresponding to the mail box associated with the destination address, i.e., the intended recipient's mail box. If not the computer either causes the message to be discarded or charges a fee to the sending party associated with the source address and stores the message in the intended recipient's mail box.

As stated above, the present invention can be used with all types of networks, including private networks, such as local area networks (LANs) and wide area networks (WANs). The present invention is also not limited with respect to the location at which the method and/or apparatus are located in the communications network. Preferably, the present invention is implemented at the intended receiving party's ISP. Alternatively, the present invention could be implemented at, for example, routers of the network or at the sending party's ISP.

Preferably, the communications protocol that is used with the present invention is TCP/IP. When using TCP/IP, the destination address of the intended receiving party and the source address the sending party are contained in the IP message, or datagram. However, many other types of communications protocols also transmit an indication of the source of the message to the intended recipient, including communications protocols that do and do not comply with the Open Systems Interconnect (OSI) model. Other types of public and private communications protocols can also be used with the present invention, including proprietary protocols, as will be understood by those skilled in the art.

All or a portion of any fee charged may be paid to the intended receiving party. A portion of the fee may be applied, for example, to the intended receiving party's ISP service account to reduce the intended receiving party's ISP service bill. Preferably, the service provided by the present invention is optional and can be enabled or disabled at the receiving party's ISP depending on whether the receiving party has subscribed to the service.

Figure 2:
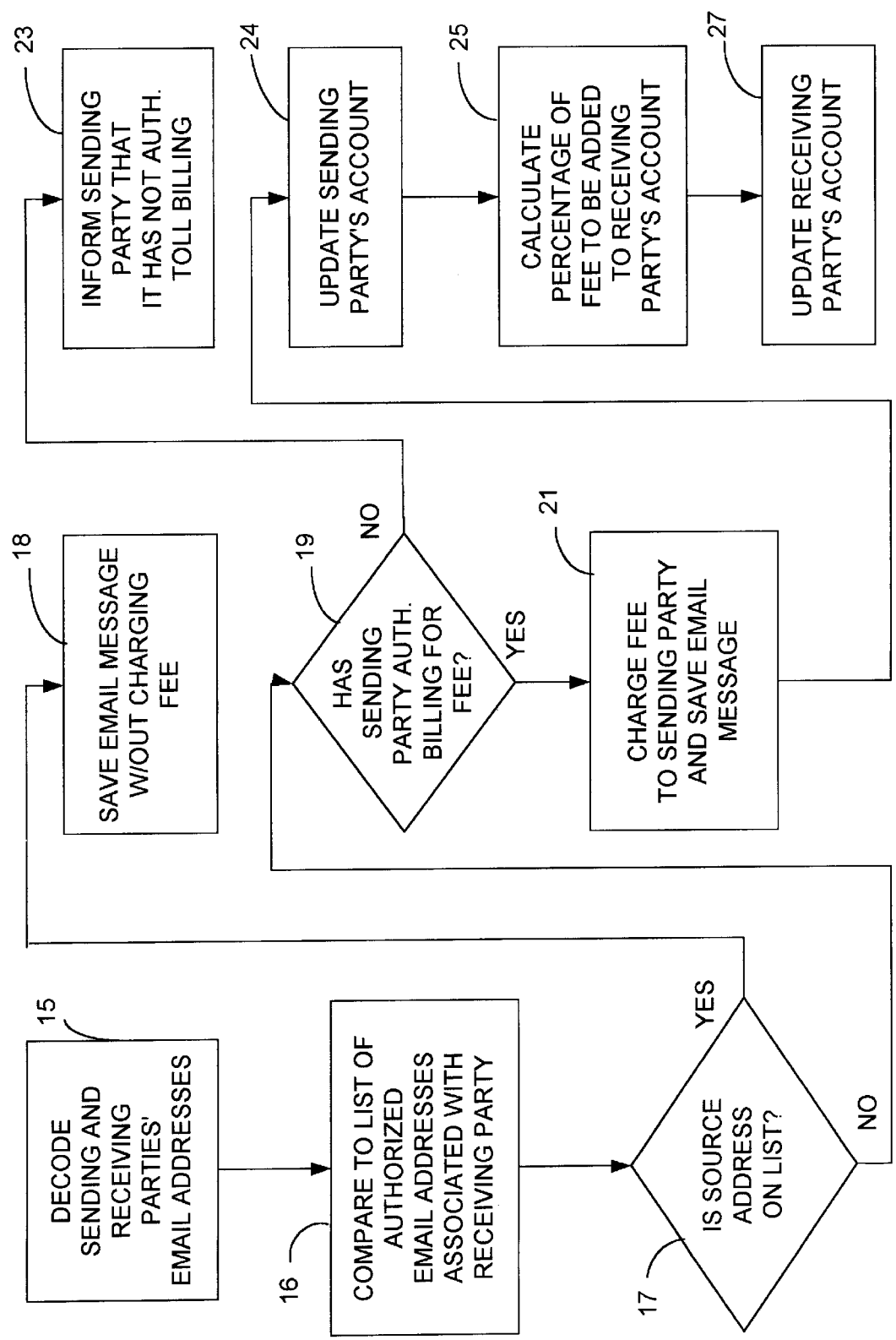
FIG. 2 is a flow chart functionally demonstrating the method of the present invention in accordance with the preferred embodiment.

FIG. 2 illustrates the method of the present invention in accordance with a preferred embodiment wherein a determination is made as to whether an e-mail message has originated from an authorized e-mail source address. The computer at the ISP decodes the datagram and obtains the source and destination addresses, as indicated at block 15. The computer then compares the source address with a list of source addresses associated with the destination address and makes a determination as to whether the source address is on a list of authorized source addresses, as indicated at block 16 and 17. Thus, the destination address is used to determine which list is associated with the intended receiving party.

If a determination is made that the source address is on the list of authorized e-mail addresses, then the e-mail message is saved in a location in a database associated with the e-mail address of the receiving party so that the receiving party can access the e-mail message, as indicated at block 18. In this case, a fee is not charged to the sending party. If the sending party's e-mail address is not on the list of authorized e-mail addresses, then a determination is made as to whether the sending party has authorized the ISP to bill it for these types of fees, as indicated at block 19. If not, the sending party is notified by an e-mail message that it has not authorized fee billing, as indicated at block 23. It should be noted that the steps illustrated at blocks 19 and 23 are optional. Alternatively, the process could proceed directly from decision block 17 to either block 18 or 21, depending on the results of the comparison.

If the sending party has authorized billing for the fees, then the fee is charged to the sending party's billing account and the e-mail message is saved in the receiving party's mailbox, as indicated at block 21. The sending party's billing account is then updated, as indicated at block 24. The percentage of the fee to be added to the receiving party's billing account is then calculated, as indicated at block 25. The receiving party's billing account is then update, as indicated at block 27.

The order in which the steps corresponding to blocks 21 through 27 are performed is not limited to any particular order. It will be understood by those skilled in the art that the order of these steps can be rearranged and performed in any suitable order.

It should be noted that the present invention has been described with respect to particular embodiments, but that the present invention is not limited to these embodiments. It will also be understood by those skilled in the art that the manner in which an unauthorized sending party is billed with a fee and the manner in which the billing account of the receiving party is updated is not limited to any particular method. Also, the location at which the billing of the fee and the updating of any accounts is performed is not limited to any particular location. The billing and updating of accounts for unauthorized e-mail addresses can be performed at the ISP location or at some other location in communication with the receiving party's ISP. It will be understood by those skilled in the art that other modifications and variations to the embodiments of the present invention discussed above can be made which are in the scope and spirit of the present invention.

What is claimed is:

1. An apparatus for determining whether a sending party sending an electronic mail communication directed to an intended receiving party is an authorized sending party, the apparatus comprising:

a computer in communication with a network, the computer being programmed to detect an indication of a source of the electronic mail communication initiated by the sending party and to compare the indication to an authorization list to determine whether or not the sending party is an authorized sending party, the authorization list corresponding to a list of sending parties from whom the intended receiving party is willing to receive electronic mail communications, wherein the computer, upon determining that a sending party is not an authorized sending party, calculates a fee to be charged to the unauthorized sending party.

2. The apparatus of claim 1, wherein the computer is located at an Internet Service Provider, the Internet Service Provider servicing the intended receiving party.

3. The apparatus of claim 2, wherein said indication corresponds to a source address associated with the sending party.

4. The apparatus of claim 2, wherein said indication corresponds to the name of the sending party.

5. The apparatus of claim 1, wherein the computer, upon determining that a sending party is not an authorized sending party, discards the electronic mail communication sent by the sending party.

6. An apparatus for determining whether a sending party sending an electronic mail communication to an intended receiving party is an authorized sending party, the apparatus comprising:

means in communication with a network for detecting an indication of an origin of an electronic mail communication initiated by the sending party and for comparing the indication to an authorization list to determine whether or not the sending party is an authorized sending party, the authorization list corresponding to a list of sending parties from whom the intended receiving party will receive electronic mail communications, wherein the computer, upon determining that a sending party is not an authorized sending party, calculates a fee to be charged to the unauthorized sending party.

7. The apparatus of claim 6, wherein said means is located at an Internet Service Provider servicing the intended receiving party.

8. The apparatus of claim 7, wherein said indication corresponds to a source address associated with the sending party.

9. The apparatus of claim 7, wherein said indication corresponds to the name of the sending party.

10. A method of determining whether a sending party sending an electronic mail communication to an intended receiving party is an authorized sending party, the method comprising the steps of:

comparing an indication of a source of the electronic mail communication with a list of authorized sending parties associated with the intended receiving party to determine whether or not the sending party is an authorized sending party, wherein if a determination is made that the sending party is not an authorized sending party, a fee is charged to the unauthorized sending party.

11. The method of claim 10, wherein prior to charging the fee to the unauthorized sending party, a determination is made as to whether the unauthorized sending party has authorized the fee to be charged to the sending party, wherein if the unauthorized sending party has not authorized the fee to be charged to the sending party, the unauthorized sending party is informed that it has not authorized the fee to be charged to the unauthorized sending party and the unauthorized sending party is provided with an opportunity to authorize the fee to be charged to the unauthorized sending party, wherein if the unauthorized sending party authorizes the fee to be charged to the sending party, the fee is charged to the unauthorized sending party and the electronic mail communication is stored in an electronic mail box associated with the intended receiving party.

12. A computer-readable medium having a computer program stored thereon, the computer program comprising:

a first code segment which determines whether an indication of an identity of a sending party sending an electronic communication to an intended receiving party is contained on a list of authorized sending parties associated with the intended receiving party; and a second code segment which generates a fee amount to be charged to the sending party if the first code segment determines that the sending party initiating the telephone call is not an authorized sending party.

13. The computer-readable medium of claim 12, further comprising a third code segment, the third code segment determining whether the sending party has authorized the fee to be charged to the sending party, the second code segment only generating the fee amount if the third code segment determines that the sending party has authorized the fee to be charged to the sending party.

14. The computer-readable medium of claim 13, further comprising a fourth code segment, the fourth code segment generating an electronic mail message to be communicated to the sending party when the third code segment determines that the sending party has not authorized the fee to be charged to the sending party, wherein the message generated and communicated to the sending party informs the sending party that the sending party has not authorized the fee to be charged to the sending party.

* * * * *